United States Patent
Nystrom et al.

(10) Patent No.: US 10,324,268 B2
(45) Date of Patent: Jun. 18, 2019

(54) METHOD OF PERFORMING AUTOFOCUS, AUTOFOCUS SYSTEM, AND CAMERA COMPRISING AN AUTOFOCUS MODULE

(71) Applicant: Axis AB, Lund (SE)

(72) Inventors: Johan Nystrom, Lund (SE); Can Xu, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/697,028

(22) Filed: Sep. 6, 2017

(65) Prior Publication Data
US 2018/0074287 A1 Mar. 15, 2018

(30) Foreign Application Priority Data

Sep. 15, 2016 (EP) .................... 16189024

(51) Int. Cl.
| | | |
|---|---|---|
| G02B 7/28 | (2006.01) | |
| G02B 7/09 | (2006.01) | |
| G06K 9/00 | (2006.01) | |
| H04N 5/232 | (2006.01) | |
| G03B 13/36 | (2006.01) | |

(52) U.S. Cl.
CPC .............. G02B 7/282 (2013.01); G02B 7/09 (2013.01); G02B 7/285 (2013.01); G03B 13/36 (2013.01); G06K 9/00624 (2013.01); H04N 5/23296 (2013.01); H04N 5/232121 (2018.08); *G03B 2205/0046* (2013.01)

(58) Field of Classification Search
CPC .......... G02B 7/282; G02B 7/285; G02B 7/09; G03B 13/36; G03B 2205/0046; G06K 9/00624; H04N 5/23296
USPC ................. 359/642, 676, 694, 696, 697, 698
See application file for complete search history.

(56) References Cited

U.S. PATENT DOCUMENTS

| | | | | |
|---|---|---|---|---|
| 5,384,615 A | * | 1/1995 | Hsieh ................ | G03B 17/20 396/147 |
| 2001/0035910 A1 | | 11/2001 | Yukawa et al. | |
| 2010/0201864 A1 | | 8/2010 | Takayama | |

FOREIGN PATENT DOCUMENTS

JP 2011118021 A 6/2011

OTHER PUBLICATIONS

Extended European Search Report issued in corresponding European Application No. 16189024.9 dated Feb. 24, 2017, 6 pages.

* cited by examiner

*Primary Examiner* — Tuyen Tra
(74) *Attorney, Agent, or Firm* — Snyder, Clark, Lesch & Chung, LLP (57) ABSTRACT

Autofocusing a camera while zooming may include zooming the lens to a first zoom position, measuring a first object distance from the camera to an object on which to focus, determining a first focus start position using the first object distance, performing a first autofocus using the first focus start position as a starting point, thereby determining a first focus position. A first lookup object distance may be determined based on the first determined focus position. A first correction factor may be calculated as a ratio between the first lookup object distance and the first object distance. The lens may be zoomed to a second zoom position, and a second focus position may be determined using a second object distance based on the first object distance and a second correction factor based on depths of field at the second and first zoom positions.

12 Claims, 4 Drawing Sheets

METHOD OF PERFORMING AUTOFOCUS, AUTOFOCUS SYSTEM, AND CAMERA COMPRISING AN AUTOFOCUS MODULE

RELATED APPLICATION

This application claims priority to European Application No. 16189024.9 filed Sep. 15, 2016, which is incorporated by reference herein.

TECHNICAL FIELD

The present invention relates to the field of autofocusing of cameras, and particularly autofocusing of PTZ cameras (i.e. cameras capable of panning, tilting and zooming.

BACKGROUND

Autofocus is a widely used functionality in cameras. It is used in handheld cameras as well as monitoring cameras, in still image cameras as well as video cameras. A number of different methods of performing autofocus are known, and they may generally be classified as either passive, active or hybrid methods. One known passive method is referred to as the max-contrast method or contrast detection method. In this method, the contrast between adjacent pixels in a captured image is studied, and by slightly changing focus around a starting point, a focus position of highest contrast is sought and, hopefully, found. The search for maximum contrast may, e.g., be performed using a mathematical optimisation technique called "hill-climbing". When a focus position has been found, this focus position and the zoom motor position are used for finding a corresponding object distance trace curve in a set of trace curves provided by the designer or supplier of the lens. The trace curves plot focus motor position against zoom motor position, with one curve for each of a number of object distances. These curves are generally theoretically calculated using theoretical characteristics of the various lenses included in a varifocal lens system. A number of curves, each based on a discrete object distance are provided. When zooming in and out wishing to keep focus at the same object distance, the trace curve is then used for finding the focus motor position that is supposed to give proper focus, such that the contrast determination does not have to be performed for each zoom position. If the object distance does not match any of the trace curves, interpolation is performed to obtain object distances between two curves.

In some situations, such as in low light conditions or in scenes with low contrast or with point-shaped light sources, it may be difficult to find a maximum for the contrast, and the autofocusing algorithm may end up "hunting", which means it keeps changing focus motor position without being able to find a maximum.

Even in good light conditions, changes in focus occurring during the autofocus process, when the algorithm seeks the best focus motor position, may appear as annoying wobbling of the image.

In active autofocus methods, an actual distance measurement to the object to focus on is made, using, e.g., a laser. The focus position may then be determined using a trace curve for the lens. Such active methods add to the cost of the camera, since they require addition of a distance measurement system, but they give the advantage of facilitating autofocus in low light conditions. They also give the advantage of an immediate focus position, such that there is no wobbling and no "hunting", as may occur with passive autofocus methods.

A problem common to the passive and active methods is that the lens mounted on the camera may deviate from the one for which the trace curve was made, such that proper focus is not achieved using the focus position indicated for the determined object distance. The individual lens may be tested during manufacture of the camera for calculating a production offset from the theoretical trace curve to be used when selecting a proper focus position. However, such offset testing is normally done only for two zoom positions, "tele" and "wide", and only for focusing at infinity. Further, for reasons of production economy, offset testing is in some cases done only once per lens type, and not for each individual lens. Even if each individual lens is tested, internal design tolerances and potential adjustment by the lens manufacturer will usually result in a practical trace curve shape that deviates from the theoretical one, such that the production offset does not apply all along the trace curves. The actual behaviour of another lens specimen, and at other zoom positions and object distances may very well deviate from the trace curve, even taking the factory or production offset into account. To make matters worse, the behaviour of the lens may vary over time, e.g., because of temperature changes or because of aging of the lens components.

In order to improve autofocusing, a hybrid method may be used, combining a passive method and an active method. For instance, laser distance measurement may be used for providing a starting point for a contrast detection method, thereby facilitating autofocusing in challenging scenes. Further, a hybrid method may reduce the risk of "hunting" and make it possible to perform the passive method quicker with a potentially better starting point, thus reducing annoying wobbling during search for an optimal focus position.

The problems associated with known autofocusing methods are often aggravated in PTZ cameras. When the camera is panned and/or tilted in a new direction, autofocusing is needed in order to focus on objects in the new field of view. Generally, the autofocusing process is not quick enough to provide focused images during a panning and/or tilting movement from one point in a monitored scene to another. Therefore, focused images may be obtained at the start of the movement and at the end of the movement, but the images there between will be blurry. The same is true for a situation where the camera is zoomed in or out. This blurriness during movement and zooming may be annoying to an operator watching a captured video sequence, for instance from a so-called "guard tour", i.e. a pre-programmed sequence of panning, tilting and zooming operations performed to monitor various parts of a monitored area. Important visual information may be lost to the operator during panning, tilting and zooming.

SUMMARY OF THE INVENTION

It is an object of the present invention to provide a method of autofocusing which may provide better focused images. It is also an object of the invention to provide a method of autofocusing which may give better focused images also during panning, tilting and zooming. Another object of the invention is to provide a method of autofocusing which may be performed quicker than prior art methods.

According to a first aspect, these and other objects are achieved, in full or at least in part, by a method of autofocusing a camera during a zooming operation, the camera comprising a zoom lens, the method comprising zooming the lens to a first zoom position, measuring a first object distance from the camera to an object on which to focus, determining a first focus start position using said first object distance, performing a first autofocusing operation using a passive autofocus algorithm and using the first focus start position as a starting point for the algorithm, thereby determining a first determined focus position, determining a first lookup object distance based on the first determined focus position, calculating a first correction factor as a ratio between the first lookup object distance and the first object distance, determining a first depth of field for said first zoom position, zooming the lens to the second zoom position, determining a second depth of field for said second zoom position, calculating a second correction factor as a product of the first correction factor and a ratio between the second depth of field and the first depth of field, calculating a second object distance as a product of the first object distance and the second correction factor, determining a second focus position using the second object distance.

Using such an autofocus method, it is possible to make better use of the trace curves provided by the lens manufacturer. Even if the individual lens used on the camera does not behave exactly like the one for which the trace curves were calculated, and even if the production offset determined for the lens type during manufacture of the camera does not quite fit the individual lens, the calculation of the first correction factor based on the measured object distance and the distance corresponding to the focus motor position found by the passive autofocus algorithm makes it possible to follow a more suitable interpolated object distance trace curve during zooming. In this manner, better focused images may be provided during zooming. Thus, an operator watching a video sequence from the camera may get more information from the images, and may be relieved of the annoyance of watching blurry images. The operator may also be relieved of watching wobbling images during autofocusing using the passive autofocus algorithm, since a better starting point may speed up the search for focus using the passive autofocus algorithm.

Further, by continuing to calculate updated correction factors based on the ratio of the depth of field at a current zoom position and the depth of field at the previous zoom position during zooming, for instance once per captured or transmitted image frame, deviations from the theoretical trace curves may be better taken into account, such that for each frame or new zoom position, a new object distance to use in the trace curve is determined.

Once the lens has reached the desired zoom position, the focus motor position found using the trace curves during the zooming operation may be used as a starting point for the passive autofocus algorithm, to determine a second determined focus position. Thus, proper focus may be found more quickly. This is also beneficial if a guard tour is ongoing, but the operator sees something of interest in the scene and interrupts the zooming operation. The latest focus motor position found using the correction factors and the trace curves may then be used as starting point for the passive autofocus algorithm, such that focused images may be provided quickly.

A second lookup object distance may be determined based on the second determined focus position, and a new correction factor may be calculated as a ratio between the second lookup object distance and the first object distance. In this manner, an updated correction factor making it easier to find a proper focus may be determined.

The method may also comprise zooming the lens to an intermediate zoom position between the first zoom position and a second zoom position, determining an intermediate depth of field for said intermediate zoom position, calculating an intermediate correction factor as a product of the first correction factor and a ratio between the intermediate depth of field and the first depth of field, calculating an intermediate object distance as a product of the first object distance and the intermediate correction factor, determining an intermediate focus position using the intermediate object distance. Hereby, autofocus positions may be determined at an intermediate zoom position, without having to perform a time-consuming passive autofocus algorithm. With such an approach, correction factors may be continually calculated during the zooming operation, such that good focus may be obtained by following suitable trace curves.

According to a variant, the method further comprises performing an intermediate autofocusing operation using the passive autofocus algorithm and using the intermediate focus position as a starting point for the algorithm, thereby determining an intermediate determined focus position. In this manner, an improved focus may be achieved also at zoom positions during the zoom operation from the first zoom position to the second zoom position. When time permits, such as when there is a high input frame rate to the passive autofocus algorithm, and the user requests a lower output frame rate, the passive autofocus algorithm may be used, with the latest determined focus position as starting point, thereby enabling possibly better focus than just by following the trace curves. This may for instance be done not for each frame during the zooming operation, but at regular or irregular intervals.

Each time the passive autofocus algorithm is used, the correction factor may be updated. For instance, an intermediate lookup object distance may be determined based on the intermediate determined focus position, and a new intermediate correction factor may be calculated as a ratio between the intermediate lookup object distance and the first object distance. The passive autofocus algorithm may be activated also for other reasons than reaching a new zoom position. For instance, the passive autofocus algorithm may be activated when the camera pans or tilts, when the monitored scene changes, e.g., because of lighting changes, and when the ambient temperature changes. The latest stored correction factor may be used also if the object to focus on is at another distance than the one for which the latest stored correction factor was determined.

The depth of field for each zoom position may be determined by requesting it from a lens controller controlling the lens.

For many lenses, it may be beneficial to use different correction factors on either side of a transitional zoom position. Therefore, the method may further comprise that at a predetermined transitional zoom position a previously stored correction factor is used, which is based on a depth of field for a zoom position between said transitional zoom position and a third zoom position, which is beyond said second zoom position, instead of based on a depth of field for a zoom position between said first zoom position and said transitional zoom position. For instance, at a zoom position of 5× zoom, there may be a "kink" in a curve illustrating the relationship between the depth of field ratio and the object distance. In order to deal with this, a correction factor previously determined for a zoom position "on the other side" of the transitional zoom position is used. Thus, what may be referred to as a tele correction factor may be continually updated during zooming on a "tele" side of the transitional zoom position, and what may be referred to as a wide correction factor may be continually updated during zooming on the "wide" side of the transitional zoom position. Once zooming in one direction, either zooming in or out, reaches the transitional zoom position, the latest determined correction factor for the zoom positions on the other side of the transitional zoom position should be used for calculating object distances.

Measuring the object distance from the camera to the object on which to focus may be performed using a distance measurement system comprised in the camera. The distance measurement system may, e.g., be a laser distance measurement system.

According to a second aspect of the invention, the above-mentioned objects are achieved, in full or at least in part by an autofocus system for autofocusing a camera during a zooming operation comprising a camera, a distance measurement system arranged to measure a first object distance from the camera to an object on which to focus, and an autofocus module arranged to perform the method of the first aspect. The autofocus system of the second aspect may be embodied in analogy with the method of the first aspect, with accompanying advantages.

According to a third aspect, these and other objects are achieved, in full or at least in part, by a camera comprising a zoom lens and an autofocus module arranged to perform the method of the first aspect.

The camera may comprise an integrated object distance measurement system arranged to measure the first object distance from the camera to an object on which to focus. The object distance measurement system may, e.g., be a laser distance measurement system.

The camera of the third aspect may generally be embodied in analogy with the method of the first aspect, with accompanying advantages.

According to a fourth aspect, these and other objects are achieved, in full or at least in part, by a computer program product comprising a computer-readable storage medium with instructions adapted to carry out the method of the first aspect when executed by a processor. The processor may be any kind of processor, e.g., a central processing unit (CPU), a graphics processing unit (GPU), a custom made processing device implemented in an integrated circuit, an ASIC, an FPGA, or logical circuitry including discrete components.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
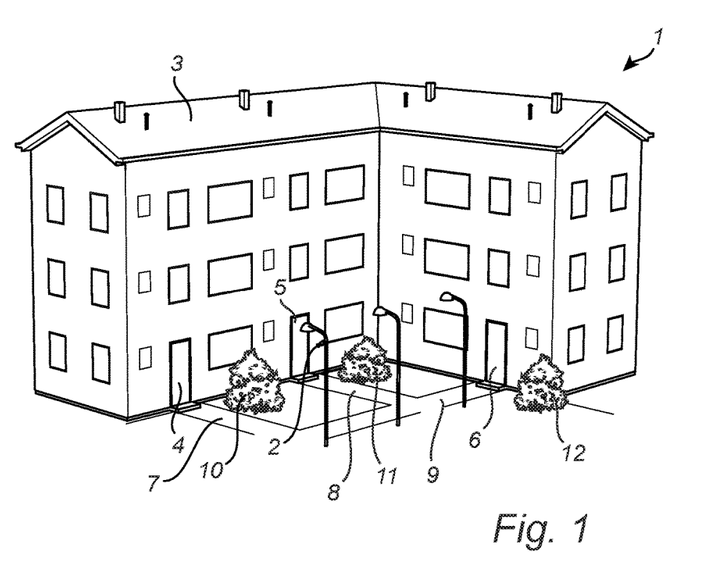
FIG. 1 illustrates a scene monitored by a PTZ camera with objects at various distances from the camera.

As seen in FIG. 1, a scene 1 is monitored using a camera 2. The scene 1 is shown from above in FIG. 2.

Figure 2:
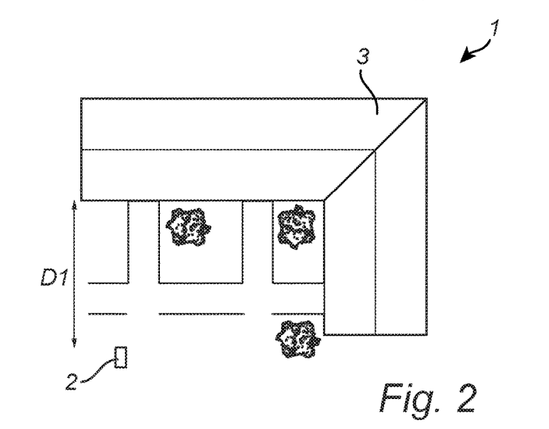
FIG. 2 illustrates the scene of FIG. 1 shown from above.

In the scene 1, there is building 3 with three doors 4, 5, 6. To each door, there is a respective path 7, 8, 9. Outside the building 3, there are three bushes 10, 11, 12.

The camera 2 is in this example a PTZ camera, i.e. a camera that is capable of panning, tilting and zooming. The same kind of functionality may be achieved using a camera having a zoom lens and mounting it on a so-called PT head, i.e. a device that pans and tilts an otherwise fixed camera.

The camera 2 captures images of the scene 1, encodes them and transmits them as a video sequence to, e.g., a control centre, where the video sequence is decoded, such that an operator may watch the video sequence live. The video sequence may also be stored for later review. The camera 2 may also have on-board storage, for instance on an SD card, where video sequences may be stored for later retrieval.

The field of view of the camera 2 may be such that it is possible to monitor only part of the scene 1 shown in FIG. 1 at a time. By panning, tilting and zooming the camera 2, the operator may monitor different parts of the scene 1. This may be done manually, using, e.g., a joystick. It may also be done utilizing a pre-programmed guard tour which visits a number of points of interest in the scene in a predetermined sequence and stays at each point of interest for a predetermined time. Each time the camera is panned and tilted to a new position, it may need to be refocused, because objects to focus on will most likely be at different distances from the camera. For instance, the camera may initially be pointed at the left door 4 and focused on that door for monitoring people entering or exiting the building 3 through the left door 4. The camera 2 may then be panned to the right to cover the centre door 5, which is slightly further away from the camera 2 than the left door 4. Thus, in order to get properly focused images of people passing through the centre door 5, the camera 2 will need to be refocused. Subsequently, the camera 2 may be panned further right to capture images of the right door 6, which is still further away from the camera 2. Again, the camera 2 will need to be refocused in order to provide properly focused images of people passing through the right door 6. At each such refocusing, an autofocusing procedure is used. Similarly, refocusing is needed each time the camera 2 is zoomed in or out, unless the focus motor is locked to the zoom motor as in a parfocal zoom lens, which may be referred to as a true zoom lens. With a varifocal lens, focus is lost during zooming, and the lens has to be refocused.

Figure 3:
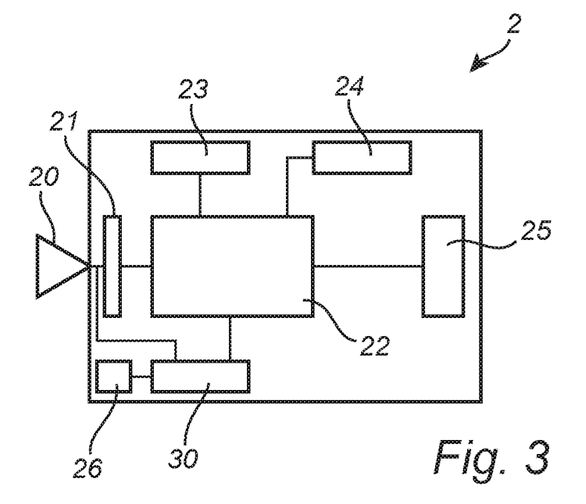
FIG. 3 is a block diagram of the camera of FIG. 1.

Reference is now made to FIG. 3, which is a simplified block diagram showing some components of the camera 2.

The camera 2 has a zoom lens 20, or strictly speaking a varifocal lens. The lens 20 comprises a zoom motor and a focus motor, none of which are explicitly shown in the drawings, but which are both well-known features of zoom lenses. Further, the camera 2 has an image sensor 21 for capturing images of the monitored scene, and processing circuitry 22 for processing images and encoding them. The camera also has memory 23 for use by the processing circuitry 22, local storage 24 for storing images in the camera, e.g., on an SD card, and a network interface 25 for transmitting images from the camera 2 to, e.g., a control centre. The camera 2 has a laser distance measurement system 26 for measuring object distances from the camera to objects on which to focus. Additionally, the camera 2 has an autofocus module 30, which is arranged to perform autofocusing.

Figure 4:
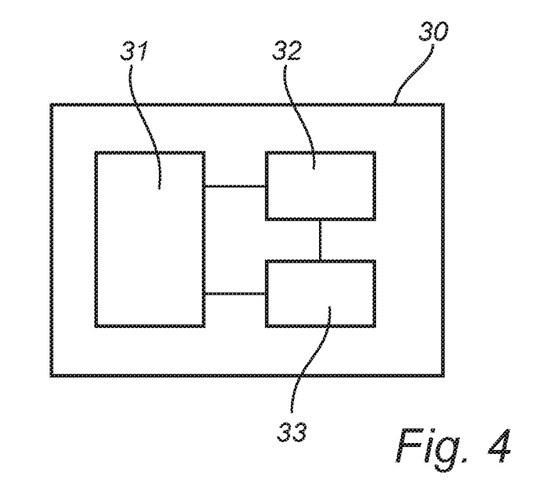
FIG. 4 is a block diagram showing an autofocus module of the camera shown in FIG. 3.

The autofocus module 30 is shown schematically in FIG. 3. It is made up of a distance input module 31, a passive autofocus algorithm module 32, and a correction factor update module 33.

With reference to FIGS. 1-6, the functioning of the camera 2, and more specifically of the autofocus module 30 will now be described with the help of a usage scenario. It will be seen that the camera 2 forms an integrated system for autofocusing.

Figure 5:
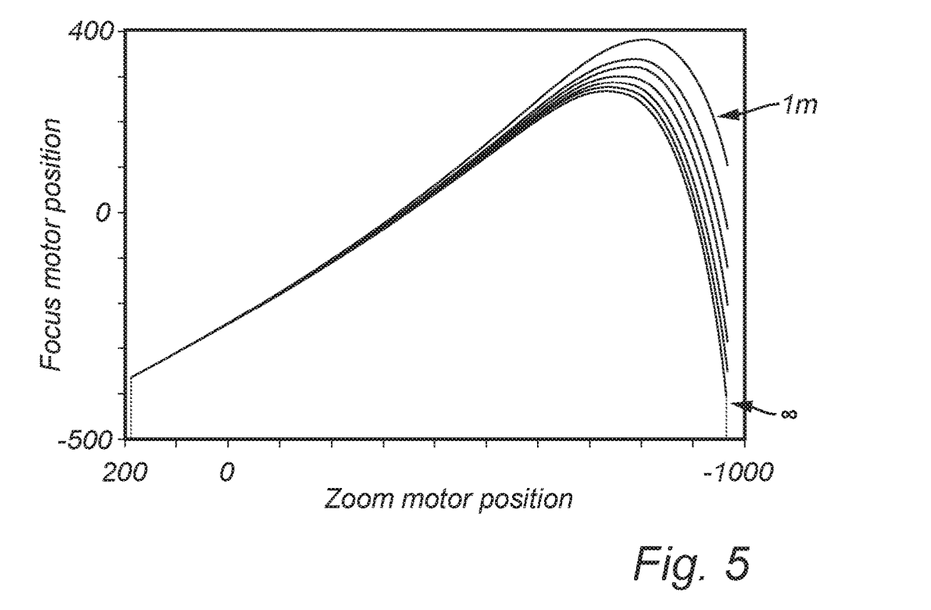
FIG. 5 is an example of a set of trace curves for a camera such as the one in FIG. 1.

An operator is monitoring the scene 1. At first the camera 2 is pointed at the left door 4 on which the camera 2 should be focused. The lens 20 is set at a first zoom position (step S1 in FIG. 6). The laser distance measurement system 26 measures a distance D1 from the camera 2 to the left door 4 (S2). In order to choose a suitable focus motor position for the measured distance D1, a trace curve provided by the lens manufacturer may be consulted. An example of a set of trace curves for a lens are shown in FIG. 5. If the lens 20 were to behave exactly in accordance with the trace curves provided by the lens manufacturer, the proper focus motor position could simply be determined by finding the curve that corresponds to the object distance D1, and finding the focus motor position on the vertical axis that corresponds to the current zoom position on the horizontal axis. However, this would in most cases not give an optimal focus position, as each individual lens may deviate from the behaviour of the trace curves, even taking the production offsets into account. Therefore, a passive autofocus algorithm is also used, making the autofocus method used a hybrid method. In this example, the passive autofocus algorithm is a contrast detection algorithm. Labelling the autofocus position found in the trace curve based on the measured distance D1 the first autofocus start position $AF1_{start}$ (S3), a new, adjusted autofocus position referred to as a first determined autofocus position AF1 is determined using the contrast detection algorithm (S4). When performing the contrast detection algorithm, the first autofocus start position $AF1_{start}$ is used as starting point. The search for a motor focus position leading to maximum contrast may be performed in a range around the first focus start position corresponding to the depth of field DOF, or, e.g., 80% of the depth of field, at the current zoom position, centred about the first autofocus start position $AF1_{start}$. The depth of field DOF may be obtained from a lens controller (not shown) controlling the lens (S7). The focus motor position AF1 found by the contrast detection algorithm will in many cases differ from $AF1_{start}$. By consulting the trace curves, a first lookup object distance D1' may be found (S5), which corresponds to the first determined focus position AF1. A first correction factor ACF1 is calculated (S6) as a ratio between the first lookup object distance D1' and the first object distance D1 in accordance with the following general formula:

$$ACF = \frac{D'}{D}$$

Here, ACF is the correction factor, D is the measured object distance, and D' is the object distance found using the passive autofocus algorithm. When zooming in or out from the first zoom position, the first correction factor is used for finding the correct trace curve at a new zoom position. However, an even better correction is achievable if the depth of field at the respective zoom position is taken into account.

Figure 6:
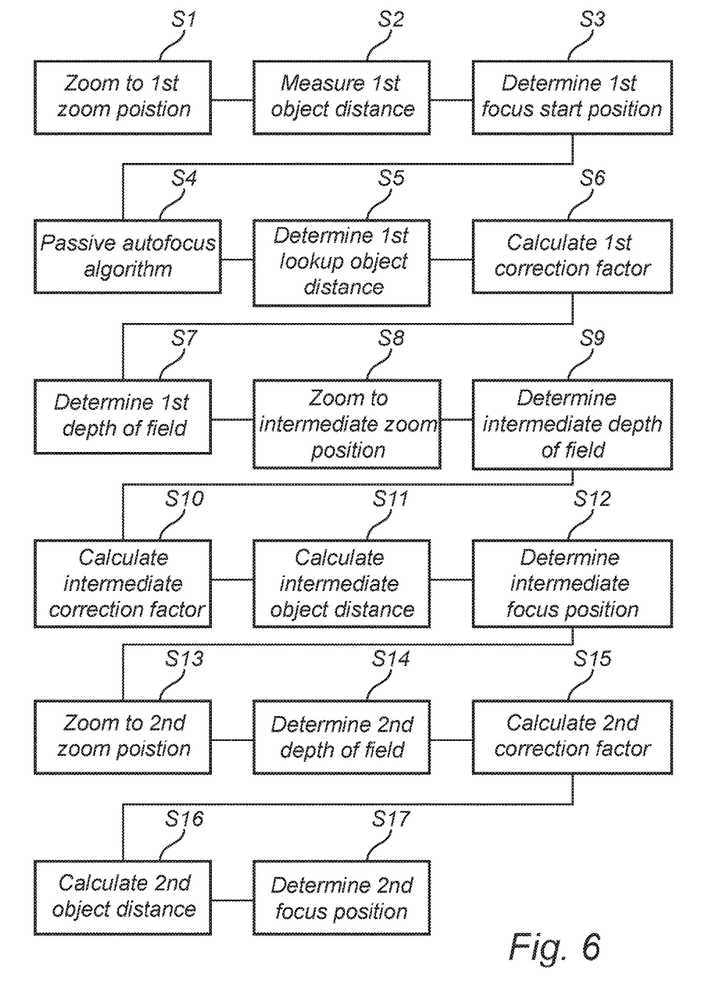
FIG. 6 is a flow chart showing a method of autofocusing.

Returning to the example of the operator monitoring the left door 4, a person appears in the doorway, and the operator wishes to zoom in on the person's face, to try to identify the person. The operator may therefore wish to zoom in from the first zoom position to a second position. Zooming will not be instantaneous, but will happen over a number of image frames. Here, it will be assumed that an intermediate zoom position is reached after the first zoom position, and that an additional zoom position is thereafter reached, before the second zoom position is reached. The skilled person will realise that any number of additional zoom positions may be traversed during zooming from the first zoom position to the second zoom position. When the lens has been zoomed to the intermediate zoom position (S8), the depth of field at the intermediate zoom position is determined (S9), labelled the intermediate depth of field DOFi. A ratio between the intermediate depth of field and the depth of field at the first zoom position, labelled the first depth of field DOF1 is calculated, and the correction factor is updated by calculating an intermediate correction factor ACFi (S10) as a product of the first correction factor ACF1 and the ratio of the depths of field DOFi/DOF1. Thus, the updated correction factor is calculated according to the following general formula:

$$ACF_{k+1} = ACF_k \frac{DOF_{k+1}}{DOF_k}$$

Here, index k signifies the previous zoom position, and index k+1 signifies the current zoom position. Each time a new correction factor is calculated, the previous correction factor is overwritten.

An intermediate object distance Di is calculated (S11) as a product of the measured first object distance D1 and the intermediate correction factor ACFi. The calculation of the object distance at the intermediate zoom position may be described using the following general formula:

$$D_{k+1} = D_1 \cdot ACF_{k+1} = D_1 \cdot ACF_k \frac{DOF_{k+1}}{DOF_k}$$

Here, index k signifies the previous zoom position, index k+1 signifies the current zoom position, and index 1 signifies the initial measurement.

This intermediate object distance Di is used for finding an intermediate focus motor position AFi in the trace curves (S12). In this way, a focused image may be provided also at the intermediate zoom position, without having to perform a time-consuming contrast detection.

The lens is then zoomed to the additional zoom position, and the process at the intermediate zoom position is repeated. Thus, the depth of field at the additional zoom position, DOFa, is determined, and a ratio between this additional depth of field and the intermediate depth of field is calculated. The correction factor is updated by calculating an additional correction factor ACFa as a product of the intermediate correction factor ACFi and the ratio of the depths of field DOFa/DOFi.

An additional object distance Da is calculated as a product of the first object distance D1 and the additional correction factor ACFi. This additional object distance Da is used for finding an additional focus motor position AFa in the trace curves. Thus, good focus may be achieved also at the additional zoom position.

When the second zoom position is reached (S13), the depth of field DOF2 at this second zoom position is determined (S14), and the correction factor is updated (S15) by calculating the product of the additional correction factor and the ratio between the second depth of field DOF2 and the additional depth of field DOFa. A second object distance D2 is calculated (S16) as a product of the second correction factor ACF2 and the measured first object distance D1. This second object distance is used for finding a second focus position AF2 in the trace curves (S17). Using this second focus position AF2 as a starting point, the contrast detection algorithm may once more be used for finding proper focus at the second zoom position. This will give a second determined autofocus position, which will correspond to a second lookup object distance D2'. The correction factor may now be updated by calculating a new correction factor ACFnew as the ratio of the measured first object distance D1 and the second lookup object distance D2'. The new correction factor is then stored and may be used later when zooming in and out.

It should be understood that although the zooming process has here been described as going from the first zoom position, via the intermediate zoom position and the additional zoom position, to the second zoom position, there may be instances where the distance in zoom position from the first to the second zoom position is so short that there will not be any image frames there between having other zoom positions, such as the intermediate and additional zoom positions. In such instance, the method is adapted in that the second object distance is calculated as a product of the first object distance D1, the first correction factor ACF1, and the ratio of the second and first depth of field DOF2/DOF1. This may, for instance happen during very slow zooming at a low output frame rate.

As mentioned in the summary, the lens may exhibit a behaviour which makes it necessary to use different correction factors for a "tele" range of zoom positions and a "wide" range of zoom positions. As an example, this transitional zoom position may occur at 5× zoom. One correction factor may be used for the "tele" range, referred to as $ACF_T$, and another correction factor may be used for the "wide" range, referred to as $ACF_W$. Both of these correction factors are calculated in the same way as described above, but each for zooming between zoom positions on the respective side of the transitional zoom position.

Once more returning to the example of the operator monitoring the left door 4 in the scene 1, the camera may have been zoomed from the first zoom position to the second position as just described, both of these two zoom positions being on the "tele" side of the transitional zoom position. After studying the face of the person appearing in the doorway, the operator wishes to zoom out to a third zoom position to be able to monitor the left door 4 as well as the centre door 5, but keeping the distance to the object to focus on. Zooming back from the second zoom position, which was zoomed in on the face of the person, to the first zoom position, which was slightly wider, but still on the "tele" side, the same process as just described is used for obtaining focused images during the zooming operation. Continuing to zoom out, the lens 20 passes the transitional zoom position. In order to calculate a transitional object distance Dt, a previously stored correction factor $ACF_W$ for the "wide" side of the transitional zoom position is used. This wide correction factor $ACF_W$ has been determined in the same way as described above, but with depths of field at zoom positions on the "wide" side of the transitional zoom position.

The transitional depth of field DOFt is determined, and the wide correction factor $ACF_W$ is updated by calculating the product of the previously stored wide correction factor with the ratio of the depths of field, as may be described more generally with the following formula:

$$ACF_{W,k+1} = ACF_{W,k} \cdot \frac{DOF_{k+1}}{DOF_k}$$

Analogously, when zooming on the "tele" side of the transitional zoom position, the tele correction factor $ACF_T$ is updated as follows:

$$ACF_{T,k+1} = ACF_{T,k} \cdot \frac{DOF_{k+1}}{DOF_k}$$

As before, index k signifies the previous zoom position, and index k+1 signifies the current zoom position.

Thus, the transitional object distance Dt is calculated as a product of the updated wide correction factor $ACF_W$ and the measured first object distance D1. In the same way as before, the transitional object distance Dt is used for finding a transitional focus motor position AFt in the trace curves.

When the camera 2, and the autofocus module 30 are started the first time, the autofocus module 30 is initialised by setting the value of each correction factor to 1, i.e. $ACF_W=1$ and $ACF_T=1$. As soon as a new correction factor has been calculated by dividing the object distance determined by the contrast autofocus algorithm with the object distance measured by the laser distance measurement system, the corresponding correction factor is updated with the new value. Thus, if the lens is set to a zoom position in the "wide" range, $ACF_W$ is updated, whereas if the lens is set to a zoom position in the "tele" range, $ACF_T$ is updated. Similarly, the respective correction factor, $ACF_W$ or $ACF_T$ is updated using the ratio between depths of field at successive zoom positions as described above.

The lens controller may determine the depth of field in accordance with the following formula at moderate to large object distances:

$$DOF \approx \frac{2Ncf^2s^2}{f^4 - N^2c^2s^2},$$

where N is the aperture setting or f-number, c is the circle of confusion, f is the focal length, and s is the object distance. It may be noted that in the description above focal length has not been discussed in detail, but rather zoom position has been discussed. These two parameters are, however, closely related, as changing of the zoom motor position entails changing the focal length of the lens.

For close-ups, the depth of field may be determined according to the following formula:

$$DOF \approx 2Nc\frac{m+1}{m^2},$$

where m is the magnification.

It should be noted that different lens manufacturers may use slightly different formulae for calculating depth of field, but as long as the depth of field can be determined, the exact formula used is not important for the inventive autofocusing method.

It will be appreciated that a person skilled in the art can modify the above described embodiments in many ways and still use the advantages of the invention as shown in the embodiments above. As an example, the inventive method has been described in the context of zooming on an object that is at a constant distance from the camera, but the same principle may be used for a constant zoom on an object that moves away from or towards the camera, such that the object distance changes. The same stored correction factor may be used regardless of the object distance, or one correction factor may be stored for each of a number of object distances. The choice of approach may depend on the type of lens used.

Further, in the embodiment described above, the camera is equipped with a laser distance measurement system which is used for measuring the distance from the camera to the object on which to focus, but the measurement system could instead use, e.g., radar or ultrasound. It would also be possible to use a separate measurement system, not integrated in the camera. As a simple measurement system, a tape measure or measuring rod may be used.

Instead of actually measuring the distance to the object on which to focus, another passive autofocus method could be used. For instance, the same algorithm performed on another, possibly more reliable camera could be used as reference instead of a physically measured distance. Alternatively, another autofocus algorithm could be performed on the same camera and used as reference. This may be beneficial if the other autofocus algorithm provides better results, but takes more time or computing power.

As described above, the depth of field is determined when the camera has reached a new zoom position. However, the order in which the steps of the method are performed is not vital. For instance, in preparation for a zooming operation from a first zoom position to a second zoom position, the depths of field for a number of intermediate zoom positions between the first and second zoom positions may be requested from the lens controller, such that they are known already before those intermediate zoom positions are reached.

In the example described, the passive autofocus algorithm is a contrast determination algorithm. The skilled person will appreciate that other passive autofocus algorithms could be used. For instance, a phase detection algorithm could be used.

The correction factor ACF has been described as being calculated initially as the ratio between the object distance corresponding to the focus motor position obtained by the contrast detection algorithm and the object distance measured by the laser measurement system. It should be understood that, since object distance and focus motor position are closely linked through the trace curves, it would also be possible to calculate the correction factor as the ratio between the focus motor position obtained by the contrast detection algorithm and the focus motor position corresponding to the measured object distance.

The trace curves from the lens manufacturer may be implemented in the autofocusing method in any desirable way. For instance, discrete points on the trace curves may be stored in a look-up table. For distances not having their own curve in the trace curve set, values may be interpolated. Alternatively, instead of forming a look-up table, a function in the form of a polynomial may be fitted on each trace curve and used for determining the relationship between object distance, zoom motor position, and focus motor position.

As an example of the transitional zoom position, 5× zoom has been mentioned. However, the transitional zoom position may vary from one lens type to another. Some lenses may have more than one transitional zoom position. For some lenses it may also be possible to continue calculating updated correction factors without using a previously stored correction factor for zoom positions beyond the transitional zoom position. Some lens types may not even have a transitional zoom position. The behaviour of a specific lens type may be determined through testing.

The invention has been described in the context of PTZ cameras, but as already mentioned, a fixed zoom camera may also function as a PTZ camera if arranged on a PT head. Further, the invention is equally applicable to fixed zoom cameras, often referred to as fixed box cameras, which are incapable of panning and tilting, but which are provided with a zoom lens, or more strictly speaking a varifocal lens.

The camera may be a monitoring camera. It may be a digital camera or an analogue camera. The camera may be any kind of camera, such as a visual light camera, an IR camera or a thermal camera.

As described above, the camera 2 forms an integrated system for autofocusing. However, such a system may also be made up of two or more separate components. For instance, the distance measurement system need not be integrated in the camera, but could be provided separately. Object distances measured by the measurement system would then be provided to the autofocus module for use in the autofocus method. Further, the autofocus module could be arranged outside the camera, but being operatively connected to the camera. As a further option, the distance measurement system and the autofocus module could be arranged in a common unit, operatively connected to the camera.

Using the inventive concept, it is possible to perform faster autofocusing, during a zooming operation or when an object to focus on is moving away from or towards the camera at constant zoom position. This way, there is less wobbling when the passive autofocus algorithm is performed, and better focus may be achieved for frames between uses of the passive autofocus algorithm. Since the correction factors are continually updated, changes in the behaviour of the lens, e.g., caused by ambient temperature changes or by aging of the lens, may be compensated for. Further, the correction factors may be monitored and an alarm event may be generated if one or both of them become larger than a predetermined threshold. This may indicate that the lens needs to be recalibrated, serviced, or even replaced.

Thus, the invention should not be limited to the shown embodiments but should only be defined by the appended claims.

The invention claimed is:

1. A method of autofocusing a camera during a zooming operation, the camera comprising a zoom lens, the method comprising
   zooming the lens to a first zoom position,
   measuring a first object distance from the camera to an object on which to focus,
   determining a first focus start position using said first object distance, and using a relationship between object distance, zoom position, and focus position,
   performing a first autofocusing operation using a passive autofocus algorithm and using the first focus start position as a starting point for the algorithm, thereby determining a first determined focus position,
   determining a first lookup object distance based on the first determined focus position,
   calculating a first correction factor as a ratio between the first lookup object distance and the first object distance,
   determining a first depth of field for said first zoom position,
   zooming the lens to the second zoom position,
   determining a second depth of field for said second zoom position,
   calculating a second correction factor as a product of the first correction factor and a ratio between the second depth of field and the first depth of field,
   calculating a second object distance as a product of the first object distance and the second correction factor, and
   determining a second focus position using the second object distance, and using the relationship between object distance, zoom position, and focus position.

2. The method of claim 1, further comprising
   performing a second autofocusing operation using the passive autofocus algorithm and using the second focus position as a starting point for the algorithm, thereby determining a second determined focus position,
   determining a second lookup object distance based on the second determined focus position, and
   calculating a new correction factor as a ratio between the second lookup object distance and the first object distance.

3. The method of claim 1, further comprising zooming the lens to an intermediate zoom position between the first zoom position and a second zoom position,
   determining an intermediate depth of field for said intermediate zoom position,
   calculating an intermediate correction factor as a product of the first correction factor and a ratio between the intermediate depth of field and the first depth of field,
   calculating an intermediate object distance as a product of the first object distance and the intermediate correction factor,
   determining an intermediate focus position using the intermediate object distance.

4. The method of claim 3, further comprising performing an intermediate autofocusing operation using the passive autofocus algorithm and using the intermediate focus position as a starting point for the algorithm, thereby determining an intermediate determined focus position.

5. The method of claim 4, further comprising determining an intermediate lookup object distance based on the intermediate determined focus position, and calculating a new intermediate correction factor as a ratio between the intermediate lookup object distance and the first object distance.

6. The method of claim 1, wherein depth of field is determined by requesting it from a lens controller controlling the lens.

7. The method of claim 1, wherein at a predetermined transitional zoom position a previously stored correction factor is used, which is based on a depth of field for a zoom position between said transitional zoom position and a third zoom position, which is beyond said second zoom position, instead of based on a depth of field for a zoom position between said first zoom position and said transitional zoom position.

8. The method of claim 1, wherein measuring the first object distance from the camera to the object on which to focus is performed using a distance measurement system comprised in the camera.

9. An autofocus system for autofocusing a camera during a zooming operation comprising
   a camera,
   a distance measurement system arranged to measure a first object distance from the camera to an object on which to focus, and
   an autofocus module arranged to perform the method of claim 1.

10. A camera comprising a zoom lens and an autofocus module arranged to perform the method of claim 1.

11. The camera of claim 10, further comprising an integrated object distance measurement system arranged to measure the first object distance from the camera to the object on which to focus.

12. A computer program product comprising a non-transitory computer-readable storage medium with instructions adapted to carry out the method according to claim 1 when executed by a processor.

* * * * *